US 11,673,081 B2

(12) United States Patent
Susanto et al.

(10) Patent No.: US 11,673,081 B2
(45) Date of Patent: Jun. 13, 2023

(54) FLOW RESTRICTOR FOR A CONTINUOUS BELT SCREEN ASSEMBLY

(71) Applicant: Aqseptence Group Pty Ltd., Queensland (AU)

(72) Inventors: Chris Susanto, Queensland (AU); Denys Visser, Queensland (AU)

(73) Assignee: Aqseptence Group Pty Ltd., Queensland (AU)

( * ) Notice: Subject to any disclaimer, the term of this patent is extended or adjusted under 35 U.S.C. 154(b) by 0 days.

(21) Appl. No.: 16/887,965

(22) Filed: May 29, 2020

(65) Prior Publication Data

US 2020/0376418 A1 Dec. 3, 2020

(30) Foreign Application Priority Data

May 30, 2019 (AU) .................... 2019901872

(51) Int. Cl.
*B01D 33/056* (2006.01)
*B01D 33/00* (2006.01)
*B01D 33/333* (2006.01)

(52) U.S. Cl.
CPC ......... *B01D 33/056* (2013.01); *B01D 33/333* (2013.01)

(58) Field of Classification Search
CPC .... B01D 33/056; B01D 33/333; B01D 33/00; B01D 33/0058; B01D 33/04; B01D 33/048; B01D 33/41; B01D 33/46; B01D 33/50; B01D 29/01; B01D 29/04; C02F 11/12; C02F 2201/002; E03F 5/106; E03F 5/10; E03F 5/14; E02B 8/023; E02B 8/02; E02B 5/04

USPC .......................... 210/160, 400, 232
See application file for complete search history.

(56) References Cited

U.S. PATENT DOCUMENTS

| | | | |
|---|---|---|---|
| 1,207,376 A | 12/1916 | Davidson | |
| 1,864,359 A | 6/1932 | Laughlin et al. | |
| 2,095,504 A | 10/1937 | Kesti et al. | |
| 2,778,194 A * | 1/1957 | Van Leeuwen | E02B 13/02 405/104 |
| 7,344,638 B2 | 3/2008 | Conroy, Jr. | |

(Continued)

FOREIGN PATENT DOCUMENTS

| | | | | |
|---|---|---|---|---|
| JP | 11-13841 | | 1/1999 | |
| WO | WO 2016/028205 A1 | * | 2/2016 | ........... B01D 33/333 |
| WO | WO 2017/149557 A1 | * | 9/2017 | ............. B01D 33/04 |

OTHER PUBLICATIONS

Bormet, Continuous Belt Screen, Screens Handling, retrieved from the internet on Jun. 3, 2013, 1 page.

(Continued)

*Primary Examiner* — Akash K Varma
(74) *Attorney, Agent, or Firm* — Patterson Thuente IP

(57) ABSTRACT

A continuous belt screen assembly and related methods of controlling flow through the continuous belt screen assembly. The continuous belt screen assembly has a base, opposed sides, an inlet and at least one outlet. The assembly, in use, is arranged in a channel having a pair of opposed walls and containing a liquid. A flow restrictor for the continuous belt screen assembly includes a body mountable to a downstream end of the assembly to restrict the liquid flowing out of the at least one outlet. The body defines at least a portion of at least one aperture configured to control a level of the liquid upstream of the body.

12 Claims, 6 Drawing Sheets

(56) References Cited

U.S. PATENT DOCUMENTS

| | | | |
|---|---|---|---|
| 7,364,652 B2 | 4/2008 | Middleton | |
| 2004/0262242 A1* | 12/2004 | Middleton | E02B 8/026 |
| | | | 210/783 |
| 2007/0215539 A1* | 9/2007 | Conroy | B01D 33/333 |
| | | | 210/400 |

OTHER PUBLICATIONS

Astim Products, Continuous Belt Screen, retrieved from the internet on Jun. 3, 2013, 1 page.
Siemens, Through Flow Traveling Water Screen, retrieved from the internet on Jun. 3, 2013, 2 pages.

* cited by examiner

FLOW RESTRICTOR FOR A CONTINUOUS BELT SCREEN ASSEMBLY

CROSS-REFERENCE TO RELATED APPLICATIONS

This application claims the benefit of priority of Australian Provisional Application No. 2019901872, filed 30 May 2019, which is hereby incorporated by reference in its entirety, and made a part of this specification.

TECHNICAL FIELD

The present disclosure relates, generally, to an accessory for a continuous belt screen assembly. More particularly, the present disclosure is directed to a flow restrictor for a continuous belt screen assembly, to a continuous belt screen assembly including the flow restrictor and to a method of controlling flow through a continuous belt screen assembly.

BACKGROUND

Continuous belt screen assemblies are used in wastewater management to remove solids and other debris from wastewater. The wastewater flows into the assembly, is screened by a moving belt screen, and exits from outlets arranged at one or both downstream sides of the assembly. The flow of wastewater in this way exerts torsional forces on the assembly which can cause material fatigue and, consequently, affect functionality of the assembly such that the assembly requires downtime for maintenance.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

SUMMARY

According to some disclosed embodiments, there is provided a flow restrictor for a continuous belt screen assembly having a base, opposed sides, an inlet and at least one outlet, the assembly, in use, being arranged in a channel having a pair of opposed walls and containing a liquid, the flow restrictor comprising: a body mountable to a downstream end of the assembly to restrict the liquid flowing out of the at least one outlet, the body defining at least a portion of at least one aperture configured to control a level of the liquid upstream of the body.

The body can be mountable to define the at least one aperture between the body and at least one of the walls of the channel.

The body can comprise two parts which are mountable to be spaced from each other and extend outwardly from the opposed sides of the assembly. The two parts can be mirror images of each other. The two parts can be mountable to extend perpendicularly to the opposed sides. The two parts can be interconnected by a bridging portion.

The body can be mountable to define a pair of laterally spaced apertures, each aperture being defined between the body and one of the walls of the channel. Each aperture can increase in width with increasing distance from the base.

The at least one aperture can be at least partially defined by at least one straight line. In addition, or instead, the at least one aperture can be at least partially defined by at least one curve.

According to other disclosed embodiments, there is provided a continuous belt screen assembly including a flow restrictor as described above.

According to further disclosed embodiments, there is provided a method of controlling flow through a continuous belt screen assembly, the continuous belt screen assembly having a base, opposed sides, an inlet and at least one outlet, the assembly, in use, being arranged in a channel having a pair of opposed walls and containing a liquid, and the method comprising restricting flow downstream of the continuous belt screen assembly by at least partially occluding a flow path at a downstream end of the continuous belt screen assembly to reduce a flow rate differential between fluid flow at the inlet of the continuous belt screen assembly and fluid flow at the at least one outlet of the continuous belt screen assembly.

The at least partially occluding the flow path at the downstream end of the continuous belt screen assembly can comprise mounting the flow restrictor as described in the first disclosed embodiment above at the downstream end of the continuous belt screen assembly.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF DRAWINGS

Embodiments of the disclosure will now be described by way of example only with reference to the accompany drawings in which.

DETAILED DESCRIPTION OF EXEMPLARY EMBODIMENTS

Figure 1:
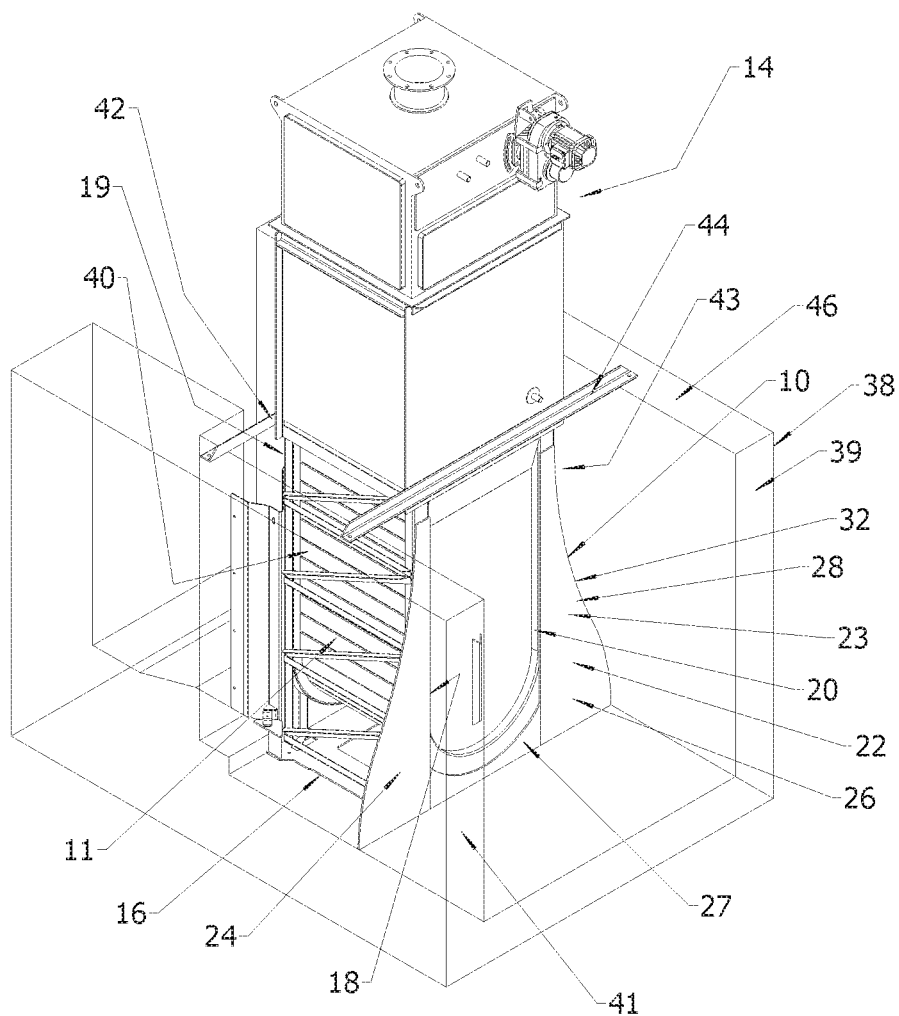
FIG. 1 shows a perspective view of a first embodiment of a flow restrictor mounted to a downstream end of a continuous belt screen assembly.

In the drawings, reference numeral 10 generally designates a flow restrictor 10 for a continuous belt screen assembly 14 having a base 16, opposed sides 18, 20, an inlet 19 and outlets 40, 43. The assembly 14, in use, is arranged in a channel 38 having a pair of opposed walls 39, 41 and containing a liquid (not shown). The flow restrictor 10 comprises a body 22 mountable to a downstream end of the assembly 14 to restrict the liquid flowing out of the outlet 40, 43. The body 22 defines at least a portion 23 of at least one aperture 48, 50 configured to control a level of the liquid upstream of the body 22.

In the embodiments illustrated in FIGS. 1-6, the body 22 of the flow restrictor 10 is mountable to define a pair of laterally spaced apertures 48, 50 defined between the body 22 and the channel 38. The apertures 48, 50 are at least partially defined by at least one straight line and/or at least one curve. It will be appreciated that, in other embodiments, at least one of the apertures 48, 50 can be fully defined by the body 22 (i.e. the body 22 contains at least one of the apertures 48, 50).

The body 22 comprises two parts, in the form of plates 24, 26, which are mirror images of each other. In an embodiment, the plates 24, 26 are mountable in the same plane but spaced from each other to extend outwardly from the opposed sides 18, 20 of the continuous belt screen assembly 14. The plates 24, 26 are shown as separate from each other and secured to the assembly 14.

However, it will be appreciated that, in other embodiments, the plates 24, 26 can be connected to each other, for example, by brace members (not shown) to enhance rigidity, and the connected plates 24, 26 mounted to the assembly 14. Similarly, the plates 24, 26 can include additional structures (not shown) at a downstream side of the plates 24, 26 to enhance rigidity such as a bridging portion 27 interconnecting the plates 24, 26. The bridging portion 27 can be formed integrally or can be secured (bolted) to the downstream end of the assembly 14, with the plates 24, 26 also being individually secured (bolted) to the downstream end of the assembly 14. It will also be appreciated that, in another embodiment, the plates 24, 26 can be mountable to diverge away from each other in a downstream direction from the continuous belt screen assembly 14.

It will also be appreciated that, in still another embodiment, the body 22 can be configured to be a unitary structure which is mountable to extend laterally outwardly from a downstream end of the assembly 14 to restrict liquid flow in the same way.

In the figures, the continuous belt screen assembly 14 is shown in a typical use environment, being installed in a channel 38 defined by opposed side walls 39, 41. The channel 38 contains water to be treated, such as wastewater, (not illustrated) which flows into and is screened by a moving belt screen 11 of the assembly 14 before exiting from two outlets 40, 43 of the assembly 14. The belt screen 11 generally moves continuously in a single direction. The assembly 14 is secured to a top surface 46 of the walls 39, 41 of the channel 38 by a pair of mounting brackets 42, 44. The liquid level upstream of the assembly 14 is typically higher than the liquid level downstream of the assembly 14 which can contribute to potentially damaging torsional forces being exerted on the assembly 14 by the liquid.

The flow restrictor 10 is mountable downstream of the continuous belt screen assembly 14 to control liquid flowing from the outlets 40, 43. In the illustrated embodiments, the plates 24, 26 are mounted to a downstream end of the assembly 14 by being connected to the sides 18, 20 of the assembly 14 by fixings, such as bolts, rivets, welds, or the like. The plates 24, 26 are configured to restrict the fluid flowing out of the outlet, while the apertures 48, 50 are configured to control a level of the liquid upstream of the plates 24, 26. The arrangement of the plates 24, 26 in this way causes the level of liquid upstream of the plates 24, 26 to rise, advantageously reducing the difference between the liquid level at the outlets 40, 43 of the assembly 14 and the liquid level upstream of the assembly 14.

In the illustrated embodiments, the plates 24, 26 are shown as mirror-images of each other to define symmetrical openings 48, 50. It will be appreciated that the body 22 of the flow restrictor 10 can be alternatively configured to define asymmetrical openings 48, 50, for example, to compensate for the direction of movement of the belt screen 11.

In another embodiment (not shown), the body 22 of the flow restrictor 10 can be mounted to project from the side walls 39, 41 into the channel 38 to define the laterally spaced apertures 48, 50 between the body 22 and the sides 18, 20 of the continuous belt screen assembly 14.

Each of the laterally spaced apertures 48, 50 increases in width with increasing distance from the base 16 of the continuous belt screen assembly 14. The configuration of the apertures 48, 50 defined in part by the flow restrictor 10, allows for the liquid level upstream (not shown) from the flow restrictor 10 to be controlled, as discussed in greater detail below.

Each plate 24, 26 defines a peripheral operative edge 28 across which the liquid flows. In the illustrated embodiments, each aperture 48, 50 is defined between the operative edge 28 of one of the plates 24, 26 and the associated side wall 39, 41 of the channel 38.

As discussed in greater detail below, each operative edge 28 is defined by at least one straight line or at least one curve. It will be appreciated that the edge 28 can, instead, be defined by a combination of lines and curves.

The plates 24, 26 are configured to be mounted such that each operative edge 28 extends from the base 16 in a direction towards the associated side 18, 20 of the assembly 14. This means that each plate 24, 26 has at least a portion which defines a width which decreases relative to distance away from the base 16.

Figure 2:
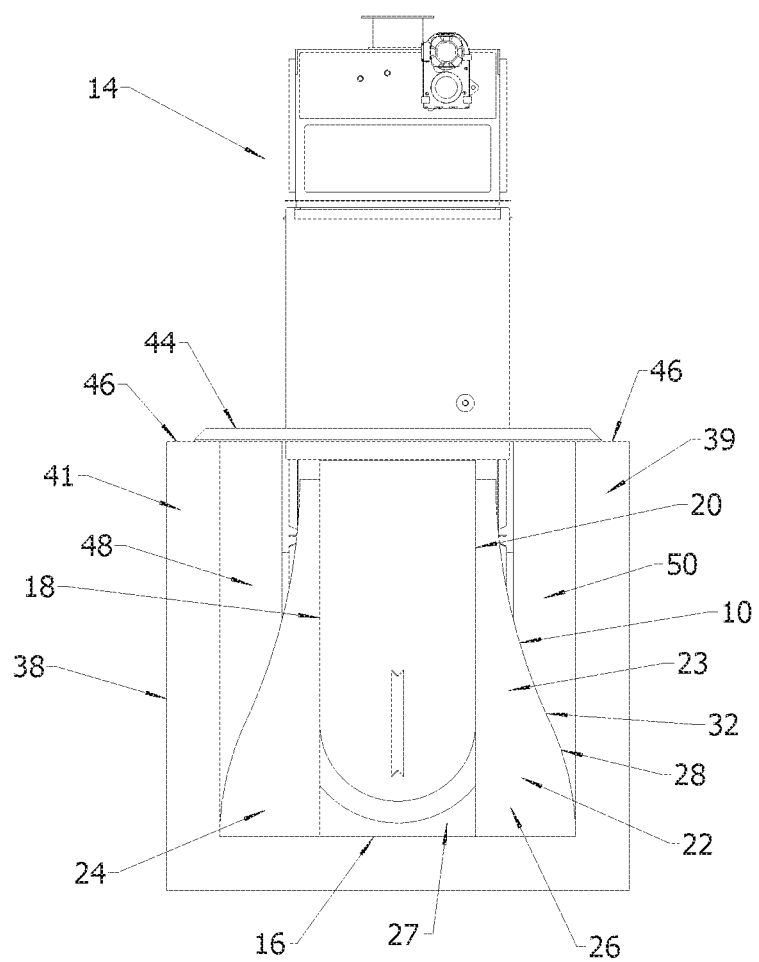
FIG. 2 shows an end view of the first embodiment of the flow restrictor mounted to the continuous belt screen assembly shown in FIG. 1.

In the embodiment shown in FIGS. 1 and 2, the plates 24, 26 are configured such that each operative edge 28 is formed from a compound curve 32, whereby the curve 32 defines a variable gradient.

Figure 3:
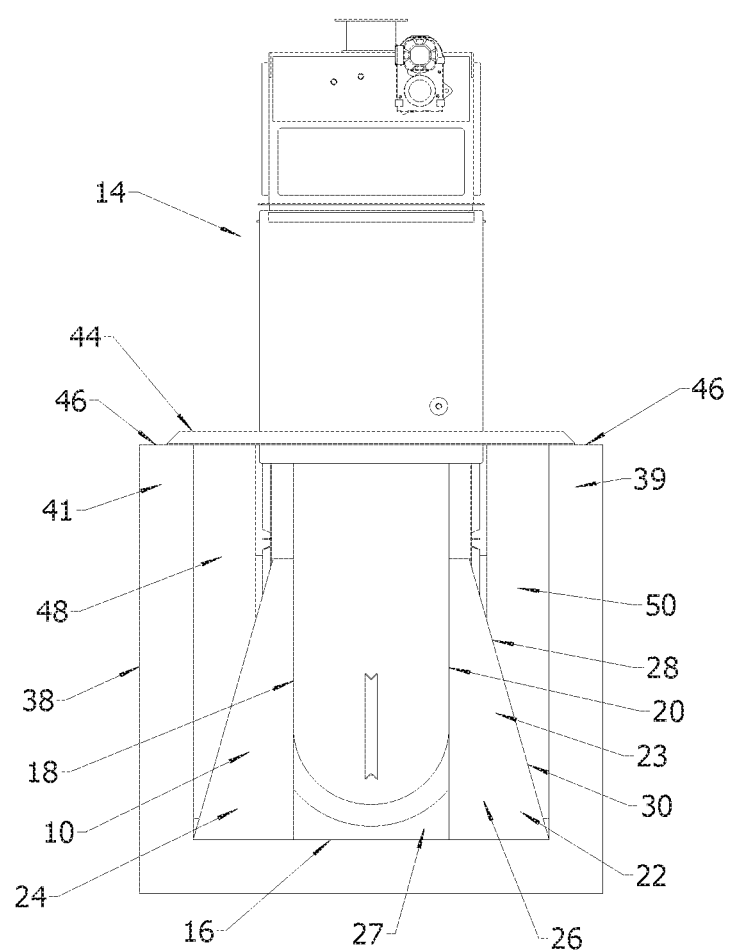
FIG. 3 shows an end view of a second embodiment of a flow restrictor mounted to the continuous belt screen assembly shown in FIG. 1.

In the embodiment shown in FIG. 3, the plates 24, 26 are configured such that each operative edge 28 defines a straight line 30 defining a first, constant gradient.

Figure 4:
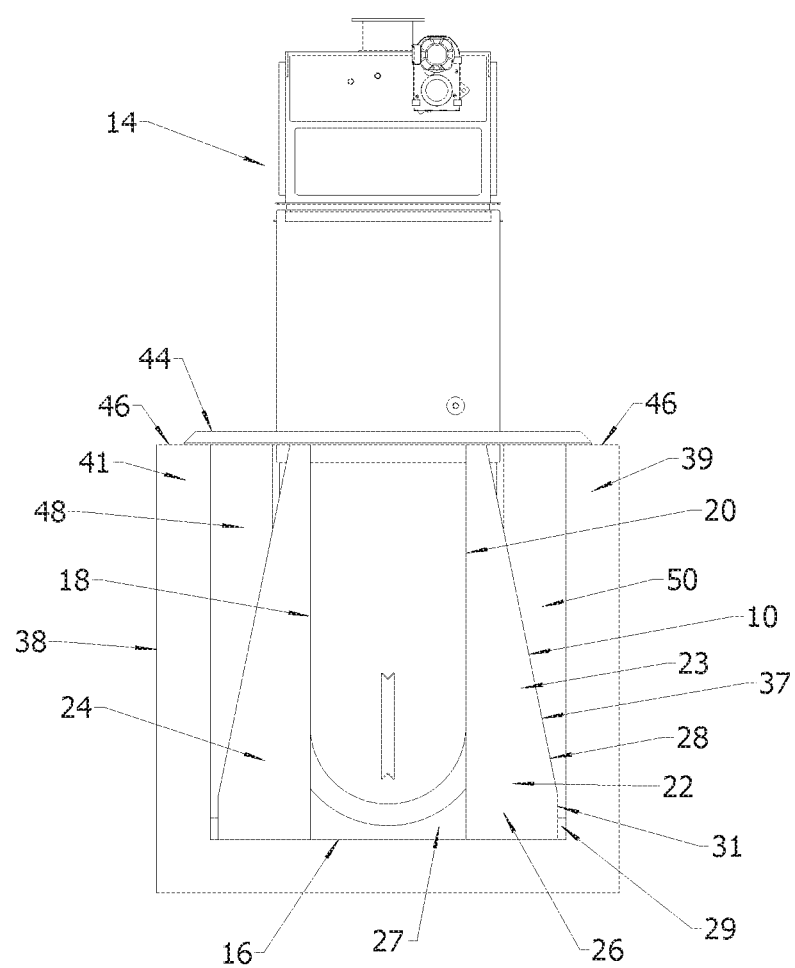
FIG. 4 shows an end view of a third embodiment of a flow restrictor mounted to the continuous belt screen assembly shown in FIG. 1.

In the embodiment shown in FIG. 4, the plates 24, 26 are configured such that each operative edge 28 defines of a first, vertical rectilinear portion 31 extending from the base 16 to define a gap 29 between each plate 24, 26 and the associated side wall 41, 39 of the channel. Each operative edge 28 further defines a second rectilinear portion 37 extending from the upper end of the portion 31 and converging towards the side 18, 20 of the assembly 14. The position of the portion 31 relative to the base 16, and the gradient of the portion 37 of the operative edge 28, affect the liquid level upstream of the plates 24, 26. Each gap 29 is dimensioned to inhibit free flow of liquid through it.

Figure 5:
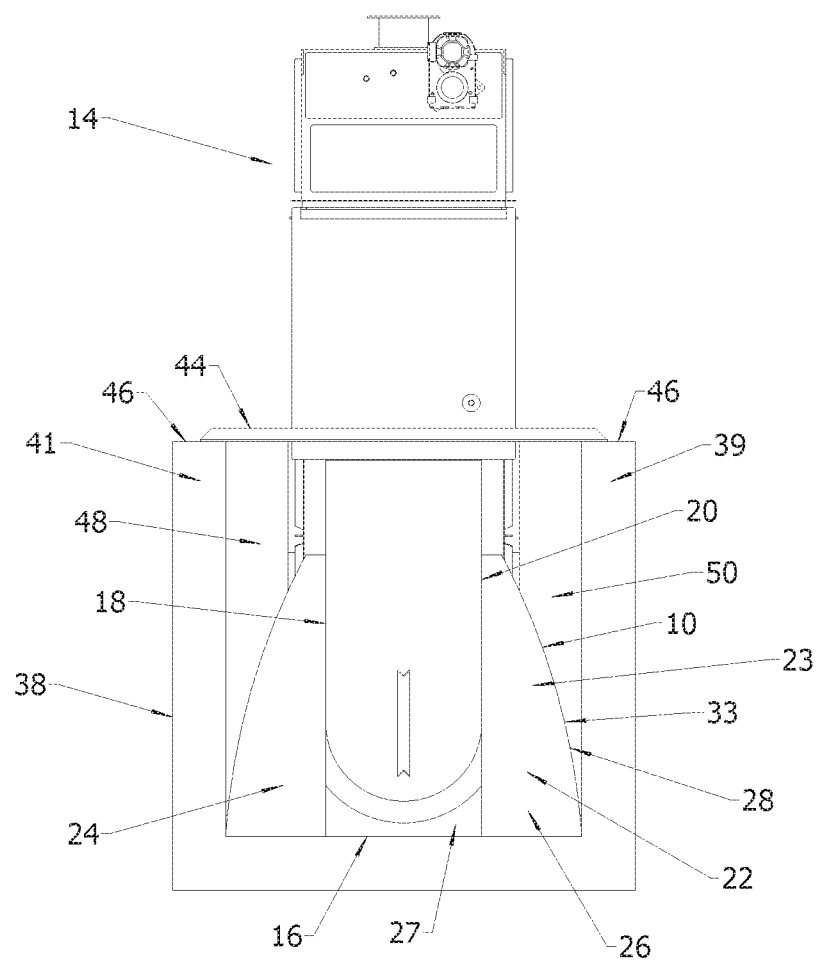
FIG. 5 shows an end view of a fourth embodiment of a flow restrictor mounted to the continuous belt screen assembly shown in FIG. 1.

In the embodiment shown in FIG. 5, the plates 24, 26 are configured such that each operative edge 28 defines a convex single curve 33 converging from the base towards the sides 18, 20 of the assembly 14.

Figure 6:
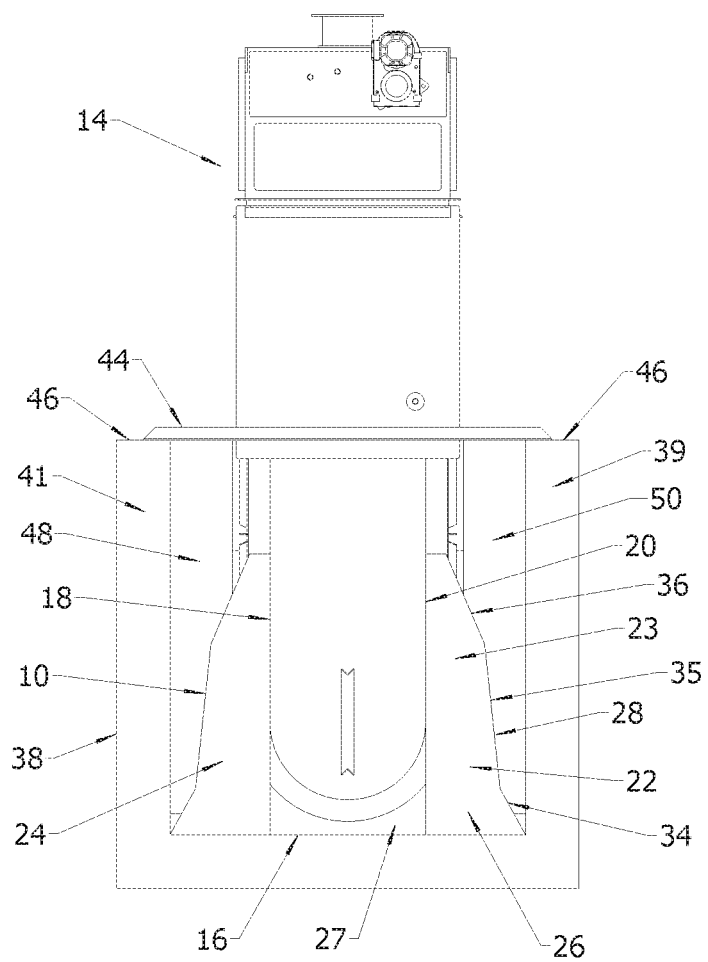
FIG. 6 shows an end view of a fifth embodiment of a flow restrictor mounted to the continuous belt screen assembly shown in FIG. 1.

In the embodiment shown in FIG. 6, the plates 24, 26 are configured such that each operative edge 28 comprises a plurality of facets 34, 35, 36 defining three different gradients but generally converging towards the sides 18, 20 of the assembly 14.

In use, the flow restrictor 10 is mounted downstream of the continuous belt screen assembly 14 installed in the channel 38. The flow restrictor 10 is configured so that, when mounted in the downstream position, it occludes liquid flowing out of the outlets 40, 43 of the assembly 14 and along the channel 38. The plates 24, 26 of the flow restrictor 10 are releasably or fixedly secured to the sides 18, 20, respectively, of the assembly 14. Liquid introduced into the channel 38 upstream of the assembly 14 is screened by the belt screen 11 and flows out of the outlets 40, 43. The liquid then encounters the plates 24, 26 which cause a damming effect to restrict flow, causing the liquid level to rise upstream of the plates 24, 26.

It will be appreciated that, alternatively, the continuous belt screen assembly 14 can be provided with the body 22 of the flow restrictor 10 being integrally formed to extend from either side of the assembly 14 (not shown). When this embodiment is installed in the channel 38 and liquid flows, as described above, the body 22 causes the damming effect, thereby controlling the liquid level upstream of the body 22.

The body 22 of the flow restrictor 10 is configured to be mounted downstream of the continuous belt screen assembly 14 and have at least a portion which defines a width which increases relative to increasing distance away from the base 16 of the assembly 14. This means that the body 22 effectively defines a tapered surface arranged to restrict flow of liquid downstream of the assembly 14. The arrangement of the body 22 in this way advantageously causes the liquid level to rise upstream of the body 22. This control of the liquid level allows the liquid level upstream of the body 22 to be adjusted to be within an acceptable range of the liquid level upstream of the assembly 14, thereby reducing torsional forces exerted on components of the assembly 14 by the liquid. Further, this control contributes to reducing the average flow velocity through the channel 38 upstream of the assembly 14, which aids uniform flow through the belt 11 of the assembly 14, thereby increasing the overall flow capacity of the assembly 14.

Advantageously, the damming effect of the flow restrictor 10 on the assembly 14 allows for a greater overall submergence of the belt 11, which, in turn, increases the flow through the assembly 14. Increasing the overall submergence of the belt 11 also decreases the flow velocity through the belt 11, which increases the potential of the belt 11 to capture more solids (i.e. less potential for solid entrainment through the belt 11). This decreased flow velocity through the belt 11 also reduces the pinning effect of solids on the panels of the assembly 14, which allows for easier and more effective cleaning by the cleaning system within the assembly 14, which, in turn, assists to maintain flow capacity of the assembly 14. Without this effect, the flow capacity would decrease over time as the panels become more difficult to clean. The damming effect also encourages a more uniform flow across the belt 11, since, without the damming, the liquid will preferentially flow to the side of the belt travelling downwards into the channel 38 (i.e. the cleaner side of the belt 11).

It will be appreciated by persons skilled in the art that numerous variations and/or modifications can be made to the above-described embodiments, without departing from the broad general scope of the present disclosure. The present embodiments are, therefore, to be considered in all respects as illustrative and not restrictive.

The invention claimed is:

1. A continuous belt screen assembly for arranging in a channel containing liquid to be treated, the continuous belt screen assembly including:
    a base and opposed sides;
    a movable belt screen defining an inlet arranged to allow liquid to flow to an inside of the movable belt screen to be screened;
    at least one outlet arranged to allow screened liquid to exit from an outside of the movable belt screen and at least one of the opposed sides; and
    a flow restrictor having:
        a body mountable downstream of the at least one outlet to cause a damming effect by restricting the liquid flowing past the body, the body defining a peripheral operative edge which, in use, the liquid flows across, the peripheral operative edge extending transverse and non-perpendicular to the at least one of the opposed sides to define at least a portion of at least one aperture arranged to control a level of the liquid upstream of the body.

2. The continuous belt screen assembly according to claim 1, wherein the body is mountable to define the at least one aperture between the body and the channel.

3. The continuous belt screen assembly according to claim 1, wherein the body comprises two parts mountable to be spaced from each other and extend outwardly from the opposed sides.

4. The continuous belt screen assembly according to claim 3, wherein the two parts are mountable to extend perpendicularly to the opposed sides.

5. The continuous belt screen assembly according to claim 3, wherein the two parts are interconnected by a bridging portion.

6. The continuous belt screen assembly according to claim 3, wherein the two parts are mirror images of each other.

7. The continuous belt screen assembly according to claim 1, wherein the body is mountable to define a pair of laterally spaced apertures, each laterally spaced aperture being defined between the body and the channel.

8. The continuous belt screen assembly according to claim 7, wherein the body is shaped such that each laterally spaced aperture increases in width with increasing distance from the base.

9. The continuous belt screen assembly according to claim 1, wherein the peripheral operative edge is at least partially defined by at least one straight line.

10. The continuous belt screen assembly according to claim 1, wherein the peripheral operative edge is at least partially defined by at least one curve.

11. A method of controlling flow through a continuous belt screen assembly, the continuous belt screen assembly having a base, opposed sides, a movable belt screen defining an inlet arranged to allow liquid to flow to an inside of the movable belt screen to be screened and at least one outlet arranged to allow screened liquid to exit from an outside of the movable belt screen and at least one of the opposed sides, the continuous belt screen assembly, in use, being arranged in a channel and containing a liquid to be treated, and the method comprising restricting flow downstream of the at least one outlet of the continuous belt screen assembly by at least partially occluding a flow path at a downstream end of the continuous belt screen assembly to reduce a flow rate differential between fluid flow at the inlet of the continuous belt screen assembly and fluid flow at the at least one outlet of the continuous belt screen assembly.

12. The method according to claim 11, wherein the at least partially occluding the flow path at the downstream end of the continuous belt screen assembly comprises mounting a flow restrictor at the downstream end of the continuous belt screen assembly, the flow restrictor comprising a body mountable to the downstream end of the continuous belt screen assembly to restrict the liquid flowing out of the at least one outlet, the body defining a peripheral operative edge which, in use, the liquid flows across, the peripheral operative edge extending transverse and non-perpendicular to the at least one of the opposed sides to define at least a portion of at least one aperture arranged to control a level of the liquid upstream of the body.

* * * * *